(12) United States Patent
Hua et al.

(10) Patent No.: US 10,542,459 B2
(45) Date of Patent: Jan. 21, 2020

(54) SYSTEMS AND METHODS FOR ACCESSING MULTIPLE APPLICATION SERVERS VIA A SERVICE CAPABILITY EXPOSURE FUNCTION

(71) Applicant: Verizon Patent and Licensing Inc., Arlington, VA (US)

(72) Inventors: Suzann Hua, Walnut Creek, CA (US); Sudhakar Reddy Patil, Flower Mound, TX (US); Ye Huang, San Ramon, CA (US); Priscilla Lau, Fremont, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 187 days.

(21) Appl. No.: 15/462,103

(22) Filed: Mar. 17, 2017

(65) Prior Publication Data

US 2018/0270710 A1 Sep. 20, 2018

(51) Int. Cl.
*H04W 4/00* (2018.01)
*H04W 28/10* (2009.01)
*H04W 8/26* (2009.01)

(52) U.S. Cl.
CPC .............. *H04W 28/10* (2013.01); *H04W 8/26* (2013.01)

(58) Field of Classification Search
CPC ......... H04W 28/10; H04W 8/08; H04W 8/26; H04L 67/146
See application file for complete search history.

(56) References Cited

U.S. PATENT DOCUMENTS

| | | | |
|---|---|---|---|
| 9,699,725 B1* | 7/2017 | Chamarty | H04W 52/0209 |
| 2004/0006693 A1* | 1/2004 | Vasnani | H04L 63/0807 |
| | | | 713/168 |
| 2012/0131144 A1* | 5/2012 | Cooper | G06F 9/5055 |
| | | | 709/219 |
| 2015/0264512 A1* | 9/2015 | Jain | H04W 4/70 |
| | | | 370/328 |
| 2016/0007316 A1* | 1/2016 | Vaidya | H04W 68/02 |
| | | | 370/312 |
| 2016/0057107 A1* | 2/2016 | Call | H04L 63/02 |
| | | | 726/11 |
| 2016/0100362 A1* | 4/2016 | Palanisamy | H04W 52/0212 |
| | | | 370/311 |
| 2016/0295504 A1* | 10/2016 | Wang | H04W 52/02 |

OTHER PUBLICATIONS

3GPP TS 29.128 (V1.1.0), Feb. 2016, pp. 1-38.*

* cited by examiner

Primary Examiner — Stephen M D Agosta

(57) ABSTRACT

A computing device may include a memory configured to store instructions and a processor configured to execute the instructions to receive a message from a user equipment (UE) device via a Mobility Management Entity (MME), wherein the computing device is configured as a Service Capability Exposure Function (SCEF) device. The processor may be further configured to identify an application server associated with the message based on one or more application server identifiers included in the received message; map uplink data, included in the received message and associated with the identified application server, to an application programming interface (API) associated with the identified application server; and send the mapped uplink data to the identified application server using the API associated with the identified application server.

20 Claims, 11 Drawing Sheets

SYSTEMS AND METHODS FOR ACCESSING MULTIPLE APPLICATION SERVERS VIA A SERVICE CAPABILITY EXPOSURE FUNCTION

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices. In order to maintain a quality of service across a network, or across multiple networks, the provider may need to take into account various requests received from wireless communication devices.

DETAILED DESCRIPTION OF PREFERRED EMBODIMENTS

Figure 1:
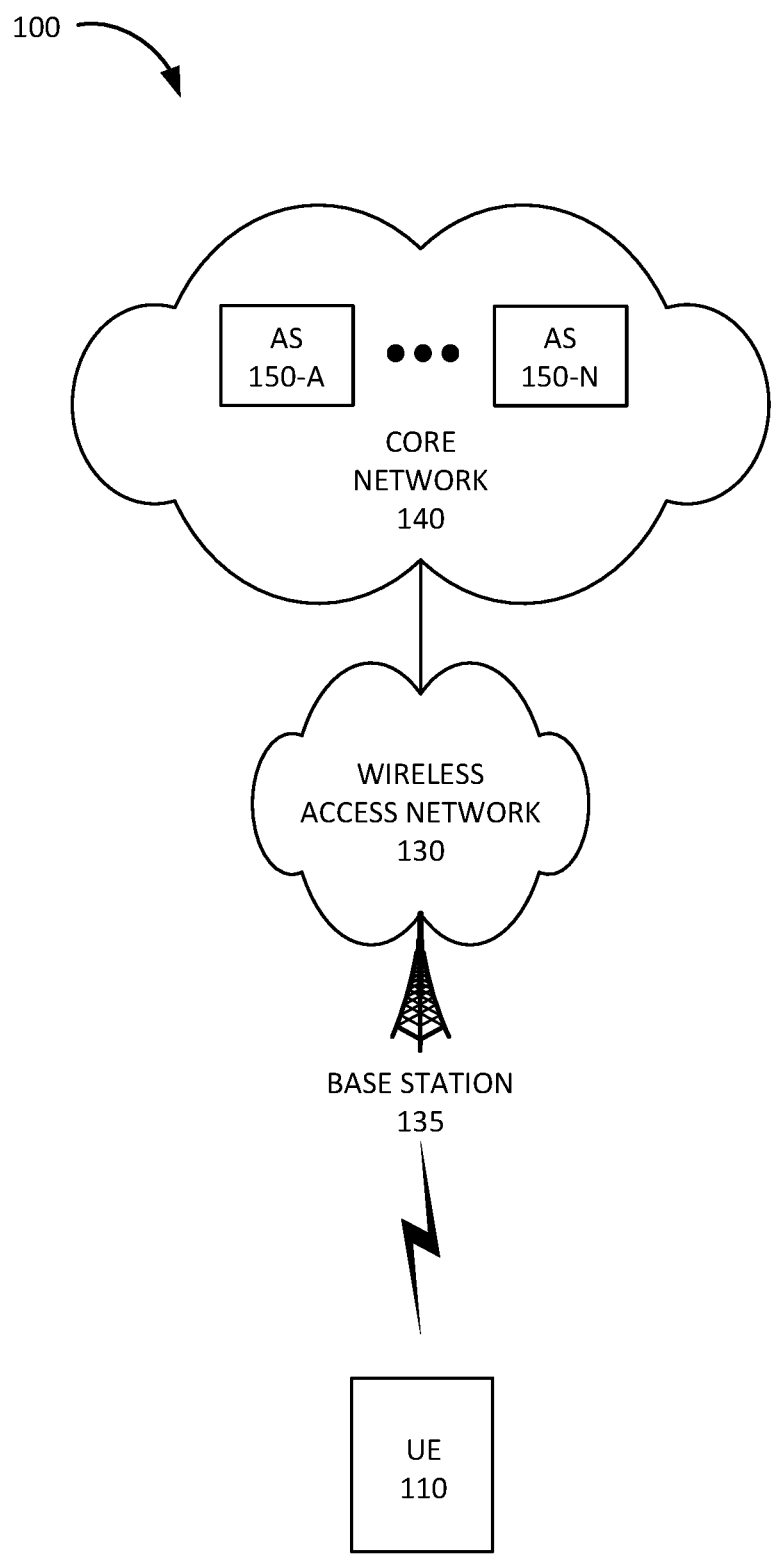
FIG. 1 is a diagram illustrating an environment according to an implementation described herein.

The following detailed description refers to the accompanying drawings. The same reference numbers in different drawings identify the same or similar elements.

As the data traffic and number of user equipment (UE) devices using wireless access networks increase, the number of different types of UE devices and the number of different types of data also increase. For example, an exponential growth in Internet of Things (IoT) applications leads to an increasing number of different types of UE devices employing machine-to-machine (M2M) communication, such as Machine-Type Communication (MTC), a type of M2M communication standard developed by the 3$^{rd}$ Generation Partnership Project (3GPP). With the growing number of MTC devices, wireless access network may need to support an increasing number of network connections. For example, each MTC device may require an Internet Protocol (IP) connection to the network in order to be able to communicate with a server device. Establishing an IP connection may require the sending and receiving of messages between devices in a wireless access network and the reservation of network resources, such as allocation of an IP address at a packet data network gateway (PGW) and establishing and maintaining a path from a base station to the PGW (referred to as a "bearer").

In order to reduce data traffic through an IP gateway and to conserve network resources, a non-IP data delivery may be implemented in a wireless access network for devices, such as MTC devices, that need to send and/or receive small amounts of data. Non-IP data delivery may be implemented using a wireless access network device configured to function as a Service Capability Exposure Function (SCEF) node.

When an SCEF is implemented in a wireless access network, a UE device may be configured to communicate with an application server (AS) via the SCEF without having to establish a physical bearer to a packet data network gateway (PGW). Instead, the UE device may be configured to communicate with an AS via an SCEF Access Point Name (APN). An APN may correspond to a name of a particular packet data network gateway that may be used to reach a particular AS. The SCEF may receive a message from the UE device and may map the APN to an AS associated with the UE device. The SCEF may then send a message to the AS via an application programming interface (API) associated with the AS.

In many situations, a UE device may need to communicate with multiple AS's. For example, a UE device may need to send sensor data to a first AS device configured to collect sensor data, device status data to a second AS device configured to monitor the health of the UE device, and report data to a third AS device configured to generate a report of the performance of the UE device. Currently, if a UE device needs to initiate communication with multiple AS's, multiple SCEF devices need to be simultaneously configured for the UE device, consuming more network resources making provisioning in a wireless access network more complicated, and increasing subscriber profile data storage requirements.

Implementations described herein relate to a wireless access network configured to support multiple AS connections for a UE device via a single APN associated with an SCEF. Thus, instead of having to configure multiple SCEF APNs for a UE device, the UE device need only be configured with a single SCEF APN. The UE device does not have to send uplink data to all AS's associated with the UE device, but may specify which AS's are to receive the uplink data by including AS identifiers in the message. Configuring a UE device with a single SCEF APN reduces computational complexity and memory requirements and conserves battery life in the UE device. Furthermore, as the UE device is using a single connection to communicate with multiple As's, network resources, such as bandwidth and processor load, are conserved.

The UE device may send a message to the SCEF APN via a Mobility Management Entity (MME). For example, the UE device may send a Non-Access Stratum (NAS) message to the MME. The NAS message may include an Evolved Packet System (EPS) bearer identifier that identifies the UE device to the MME and one or more AS identifiers that identify which AS's are to receive uplink data included in the message. The AS identifiers may be represented with short codes (e.g., a set of one or more bits) in order to reduce the data size that needs to be sent via the NAS message.

The MME may generate a message based on the received NAS message and send the generated message to a computer device associated with the APN and configured as an SCEF node. The message may correspond, for example, to a Diameter protocol message sent via a T6a interface. The Diameter protocol T6a message may include the EPS bearer ID that identifies the UE device to the SCEF, the one or more AS identifiers included in the NAS message, and the non-IP uplink data included in the NAS message from the UE device. In other implementations, other message types may be used, such as message types associated with other protocols used by a wireless access network (e.g., General Tunneling Protocol (GTP), etc.).

Thus, the computer device configured as an SCEF node may receive a message from the UE device via the MME. The computer device may identify one or more AS's associated with the message based on one or more AS identifiers included in the received message. Thus, the computer device may map an identifier associated with UE device to one or more AS identifiers.

The computer device may then map uplink data, included in the received message and associated with an identified AS, to an application programming interface (API) associated with the identified AS and send the mapped uplink data to the identified AS using the API associated with the identified AS. The mapping of uplink data to an API associated with an identified AS and sending of the mapped uplink data to the identified AS using the API associated with the identified AS may be performed for each AS identifier included in the received message.

If no AS identifiers are included in the received message, the computer device may send uplink data included in the received message to all AS's associated with the UE devices. For example, the computer device may receive a message from the MME associated with the UE device, determine that the received message does not include an AS identifier, and send a message to all AS's associated with the UE device, in response to determining that the received message does not include an AS identifier. In some implementations, a wildcard AS code may be used by UE device to indicate that the uplink data should be sent to all AS's associated with the UE device.

Furthermore, the computer device may be configured to send downlink data from an AS to a UE device via a non-IP connection. The computer device may receive an AS message from an AS associated with the UE device, determine an AS identifier associated with AS from which the message was received, and may send a Diameter message for the UE device to the MME. The Diameter message may include the AS identifier associated with the received downlink data. The AS identifier may enable the UE device to determine which AS sent the downlink data. The MME may receive the Diameter message and may forward the downlink data, along with the AS identifier to the UE device (e.g., by sending a NAS message to the UE device).

FIG. 1 is a diagram of an exemplary environment 100 in which the systems and/or methods, described herein, may be implemented. As shown in FIG. 1, environment 100 may include a UE device 110, an access network 130, and a core network 140.

UE device 110 may correspond to an embedded wireless MTC device that communicates wirelessly with other devices over a machine-to-machine (M2M) interface. For example, UE device 110 may be electrically coupled to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones, aerostats, or other aerial devices.

In yet other implementations, UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, premium Internet access etc.), best effort data traffic, and/or other types of applications.

Access network 130 may provide access to core network 140 for wireless devices, such as UE device 110. Access network 130 may enable UE device 110 to connect to core network 140 for mobile telephone service, Short Message Service (SMS) message service, Multimedia Message Service (MMS) message service, Internet access, cloud computing, and/or other types of data services. Access network 130 may include a base station 135 and UE device 110 may wirelessly communicate with access network 130 via base station 135. Access network 130 may establish a packet data network connection between UE device 110 and core network 140 via one or more APNs. For example, access network 130 may establish an Internet Protocol (IP) connection between UE device 110 and core network 140.

In some implementations, access network 130 may include a Long Term Evolution (LTE) access network (e.g., an evolved packet core (EPC) network) based on the LTE standard specified by the 3$^{rd}$ Generation Partnership Project (3GPP). In other implementations, access network 130 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

In other implementations, access network 130 may include an LTE Advanced (LTE-A) access network and/or a 5G access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Core network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE device 110, and may interface with other external networks. Core network 140 may include one or more server devices and/or network devices, or other types of computation or communication devices. In some implementations, core network 140 may include an Internet Protocol Multimedia Sub-system (IMS) network (not shown in FIG. 1). An IMS network may include a network for delivering IP multimedia services as specified by 3GPP and may provide media flows between UE device 110 and external IP networks or external circuit-switched networks (not shown in FIG. 1). Core network 140 may include AS's 150-A to 150-N (referred to herein individually as "AS 150" and collectively as "AS's 150").

AS 150 may include one or more devices, such as computer devices and/or server devices, which receive uplink data from UE device 110 and/or which send downlink data to UE device 110. For example, AS 150 may be configured to collect sensor data from UE device 110, to receive reports from UE device 110, such as error reports and/or health status reports, to receive billing information from UE device 110, to receive location information from UE device 110, to receive requests for instructions from UE device 110, to receive requests for updates from UE device 110, and/or to receive other types of information from UE device 110. Additionally or alternatively, AS 150 may be configured to send sensor data to UE device 110, to send control instructions to an actuator associated with UE device 110, to send updates to UE device 110, to send instructions to perform particular actions by UE device 110, to send authentication information to UE device 110, to send a query for a particular type of information to UE device 110, and/or to send other types of data and/or instructions to UE device 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
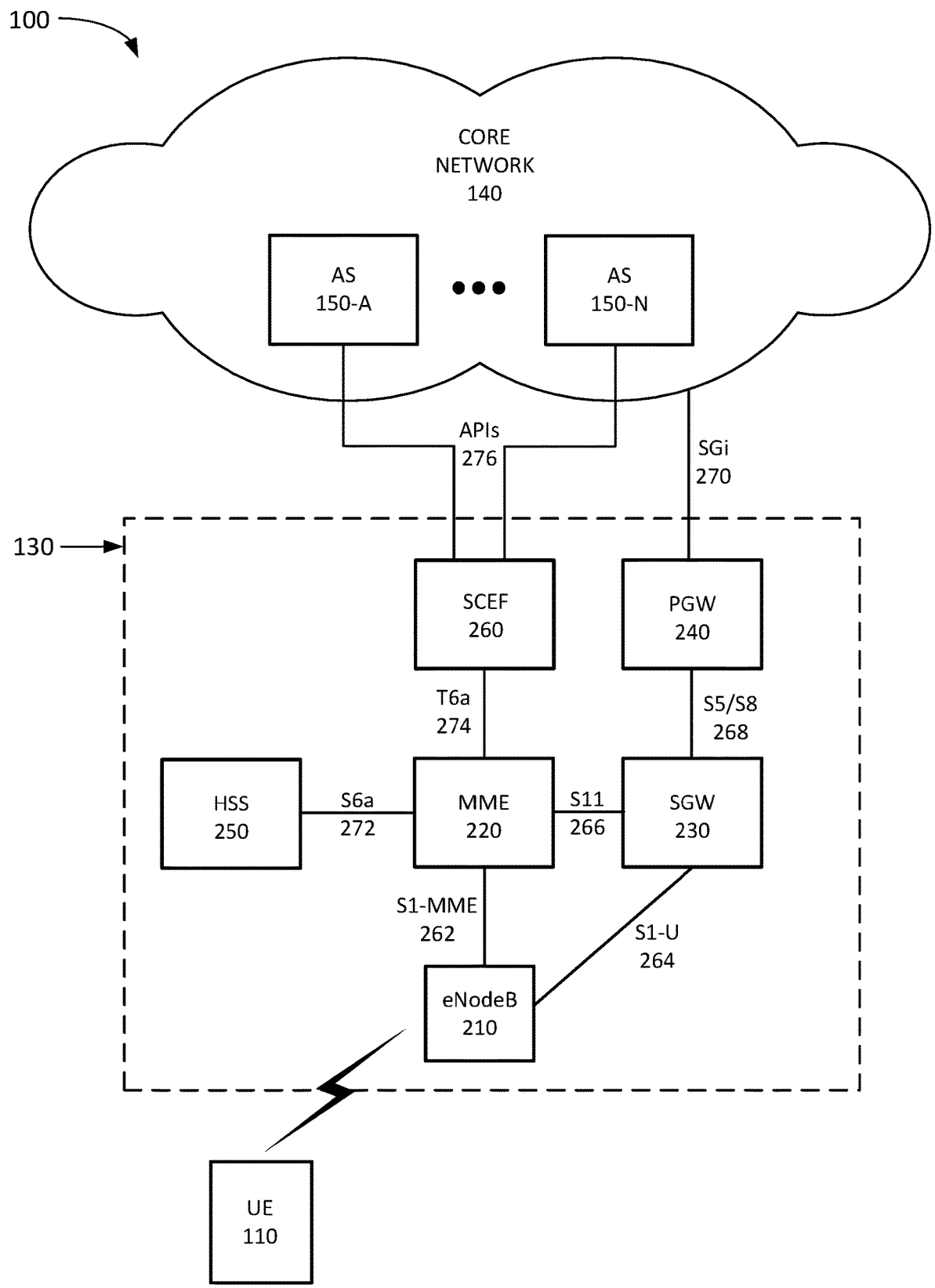
FIG. 2 is a diagram illustrating exemplary components of the access network of FIG. 1.

FIG. 2 is a diagram illustrating exemplary components of access network 130 in the context of environment 100 according to an implementation described herein. As shown in FIG. 2, access network 130 may include eNodeB 210 (corresponding to base station 135), a mobility management entity (MME) 220, a serving gateway (SGW) 230, a PGW 240, a home subscriber server (HSS) 250, and an SCEF 260. While FIG. 2 depicts a single eNodeB 210, MME 220, SGW 230, PGW 240, HSS 250, and SCEF 260 for illustration purposes, in practice, FIG. 2 may include multiple eNodeBs 210, MMEs 220, SGWs 230, PGWs 240, HSS 250, and SCEFs 260.

eNodeB 210 may include one or more devices (e.g., base stations) and other components and functionality that allow UE device 110 to wirelessly connect to access network 130 (e.g., base station 135). eNodeB 210 may include or be associated with one or more cells. For example, each cell may include a radio frequency (RF) transceiver facing a particular direction. eNodeB 210 may interface with access network 130 via an interface referred to as an S1 interface, which may be split into a control plane S1-MME interface 262 and a data plane S1-U interface 264. S1-MME interface 262 may interface with MME 220. S1-MME interface 262 may be implemented, for example, with a protocol stack that includes a Network Access Server (NAS) protocol and/or Stream Control Transmission Protocol (SCTP). An S1-U interface 264 may interface with SGW 230 and may be implemented, for example, using GTPv2.

MME 220 may implement control plane processing for access network 130. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMES 220 in access network 130 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 268. S5/S8 interface 268 may be implemented, for example, using GTPv2.

PGW 240 may function as a gateway to provider network 240 through an SGi interface 270. A particular UE device 110, while connected to a single SGW 230, may be connected to multiple PGWs 240, one for each packet network with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 220 may communicate with SGW 230 through an S11 interface 266. S11 interface 266 may be implemented, for example, using GTPv2. S11 interface 266 may be used to create and manage a new session for a particular UE device 110. S11 interface 266 may be activated when MME 220 needs to communicate with SGW 230, such as when the particular UE device 110 attaches to access network 130, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 210 and/or information associated with users of UE devices 210. For example, HSS 250 may store subscription profiles that include authentication and access authorization information. Each subscription profile may include a list of UE devices 210 associated with the subscription as well as an indication of which UE device 110 is active (e. g., authorized to connect to access network 130 and to core network 140). MME 220 may communicate with HSS 250 through an S6a interface 272. S6a interface 272 may be implemented, for example, using a Diameter protocol.

SCEF 260 may function as an interface between AS 150 and UE device 110 for non-IP data delivery. Thus, SCEF 260 may expose the services and/or capabilities of AS's 150 to UE devices 110. MME 220 may communicate with SCEF 260 through an T6a interface 274. T6a interface 274 may be implemented, for example, using a Diameter protocol. T6a interface 274 may be configured in MME 220 and SCEF 260 to include an attribute-value pair (AVP) in an MO-Data-Request message to indicate destination AS's 150 and/or to include an AVP in an MT-Data-Request to indicate an originating AS 150. SCEF 260 may communicate with ASs 150 using APIs 276.

Although FIG. 2 shows exemplary components of access network 130, in other implementations, access network 130 may include fewer components, different components, differently arranged components, or additional components than depicted in FIG. 2. Additionally or alternatively, one or more components of access network 130 may perform functions described as being performed by one or more other components of access network 130.

Figure 3:
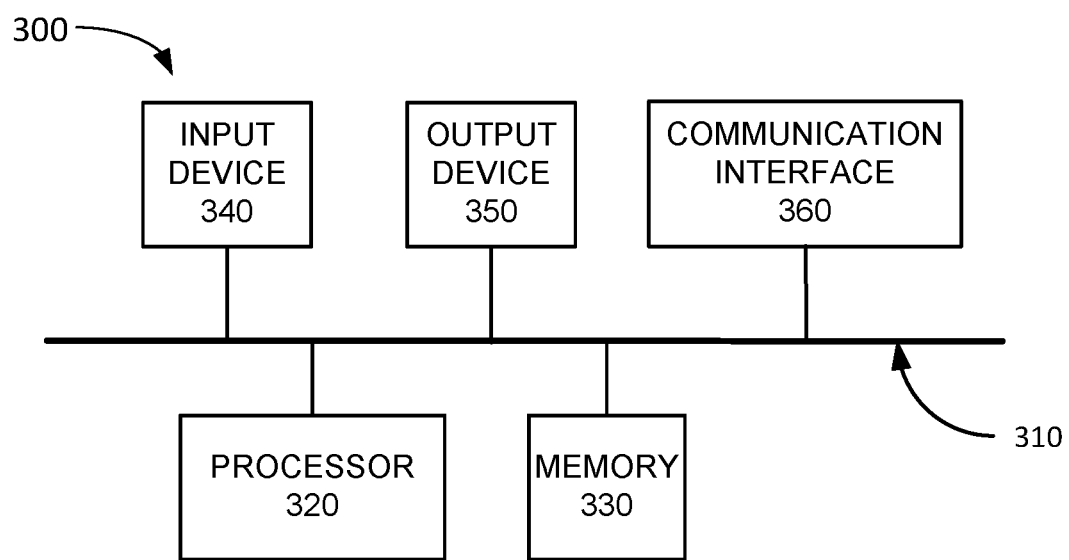
FIG. 3 is a diagram illustrating exemplary components of a device that may be included in a device of FIG. 1 or a device of FIG. 2.

FIG. 3 is a diagram illustrating example components of a device 300 according to an implementation described herein. UE device 110, eNodeB 210, MME 220, SGW 230, PGW 240, HSS 250. SCEF 260, and/or AS 150 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to operation of an SCEF device. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4A:
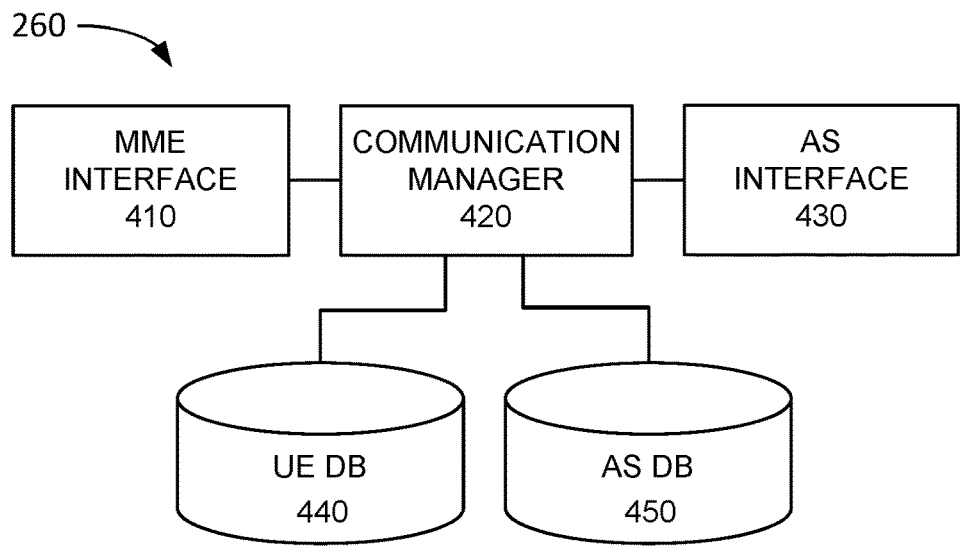
FIG. 4A is a diagram illustrating exemplary functional components of the Service Capability Exposure Function of FIG. 2.

FIG. 4A is a diagram illustrating exemplary functional components of SCEF 260. The functional components of SCEF 260 may be implemented, for example, via processor 320 executing instructions from memory 330. Alternatively, some or all of the functional components included in SCEF 260 may be implemented via hard-wired circuitry. As shown in FIG. 4, SCEF 260 may include an MME interface 410, a communication manager 420, an AS interface 430, a UE DB 440, and an AS DB 450.

MME interface 410 may be configured to communicate with MME 220. For example, MME interface 410 may receive Diameter protocol messages from MME 220 via T6a interface 274 and may send Diameter protocol messages to MME 220 using T6a interface 274. Communication manager 420 may generate messages to AS's 150 based on messages received from UE devices 110 via MME 220, and/or may generate messages to UE devices 110 via MME 220 from AS's 150, based on information stored in UE DB 440 and AS DB 450.

AS interface 430 may be configured to communicate with AS's 150 using APIs 276. For example, AS interface 430 may send a message containing uplink data to AS 150 using an API associated with AS 150 and/or may receive a message containing downlink data for UE device 110 using the API.

UE DB 440 may store information relating to particular UE devices 110. Exemplary information that may be stored in UE DB 440 is described below with reference to FIG. 4B. AS DB 450 may store information relating to particular AS's 150. Exemplary information that may be stored in UE DB 450 is described below with reference to FIG. 4C.

Although FIG. 4A shows exemplary components of SCEF 260, in other implementations, SCEF 260 may include fewer components, different components, additional components, or differently arranged components than depicted in FIG. 4A. Additionally or alternatively, one or more components of SCEF 260 may perform one or more tasks described as being performed by one or more other components of SCEF 260.

Figure 4B:
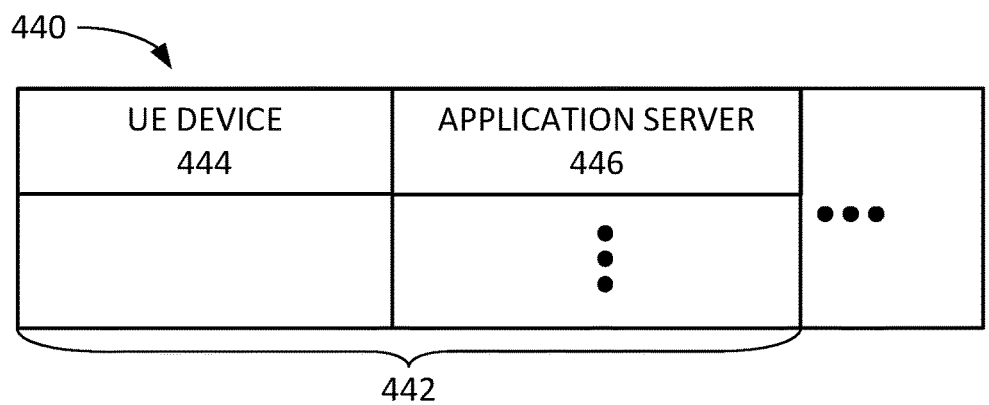
FIG. 4B is a diagram illustrating exemplary components of the user equipment database of FIG. 4A.

FIG. 4B is a diagram illustrating exemplary components that may be stored in UE DB 440. As shown in FIG. 4B, UE DB 440 may include one or more UE records 442. Each UE record 442 may store information relating to a particular UE device 110. UE record 442 may include a UE device field 444 and one or more application server fields 446.

UE device field 444 may store information identifying the particular UE device 110. As an example, UE device field 444 may include an EPS bearer identifier. As another example, UE device 444 may include a Media Access Control (MAC) address, an Internet Protocol (IP) address, a Session Initiation Protocol (SIP) address, a Mobile Station International Subscriber Directory Number (MSISDN), an International Mobile Subscriber Identity (IMSI) number, a Mobile Directory Number (MDN); and/or by another type of identifier associated with UE device 110.

Application server field 446 may store information identifying a particular AS 150 associated with UE device 110. For example, application server field 446 may store a short code associated with AS 150 that may be included in a message from UE device 110, an APN associated with AS 150, an IP address associated with AS 150, a descriptive name associated with AS 150, and/or another type of AS identifier. Furthermore, in some implementations, application server field 446 may include additional information, such as information identifying a particular time period during which the association between the particular UE device 110 and the particular AS 150 is valid and/or active, information identifying a category associated with the particular AS 150, information identifying one or more triggering conditions that may determine whether the status of the association between the particular UE device 110 and the particular AS 150 should change (e.g., from valid to invalid or vice versa, from active to inactive or vice versa, etc.), and/or other types of information relating to the association between the particular UE device 110 and the particular AS 150. The information stored in application server field 446 may further be used to identify a destination associated with the particular AS 150 (e.g., based on an AIP address, APN, and/or another identifier stored in application server field 446).

Although FIG. 4B shows exemplary components of UE DB 440, in other implementations, UE DB 440 may include fewer components, different components, additional components, or differently arranged components than depicted in FIG. 4B.

Figure 4C:
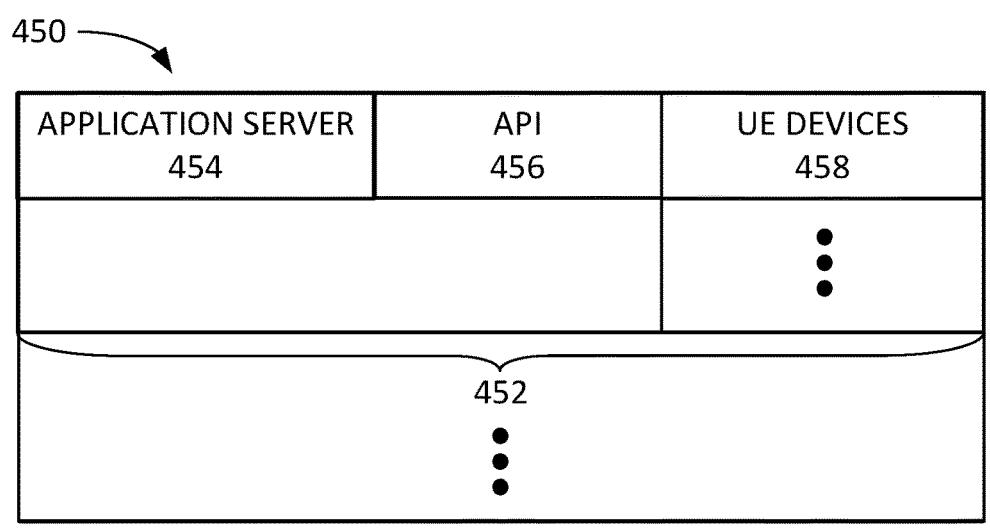
FIG. 4C is a diagram illustrating exemplary components of the application server database of FIG. 4A.

FIG. 4C is a diagram illustrating exemplary components that may be stored in AS DB 450. As shown in FIG. 4C, AS DB 450 may include one or more AS records 452. Each AS record 452 may store information relating to a particular AS 150. AS record 452 may include an AS field 454, an API field 456, and one or more UE devices fields 458.

AS field 454 may include information identifying a particular AS 150. For example, AS field 454 may store one or more AS identifiers associated with the particular AS 150, such as the identifiers described above with respect to application server field 446. API field 456 may include information relating to one or more APIs associated with the particular AS 150. For example, API field 456 may specify a communication protocol and/or message format for sending messages to the particular AS 150 and/or for receiving messages from the particular AS 150. Furthermore, API field 456 may specify a mapping between uplink data parameters and fields of the message format. For example, a particular AVP pair included in the uplink data may be mapped to a particular parameter name and parameter value in the message format. In some implementations, AS field 454 may include information relating to multiple APIs associated with the particular AS 150. For example, SCEF 260 may select a particular API based on received uplink data associated with the particular AS 150 (e.g., based on a particular bit pattern and/or a particular parameter name included in the uplink data).

UE devices field 458 may store information identifying particular UE devices 110 associated with the particular AS 150. For example, UE devices field 458 may include one or more UE device identifiers such as the identifiers described above with respect to UE device field 444.

Although FIG. 4C shows exemplary components of AS DB 450, in other implementations, AS DB 450 may include fewer components, different components, additional components, or differently arranged components than depicted in FIG. 4C.

Figure 5:
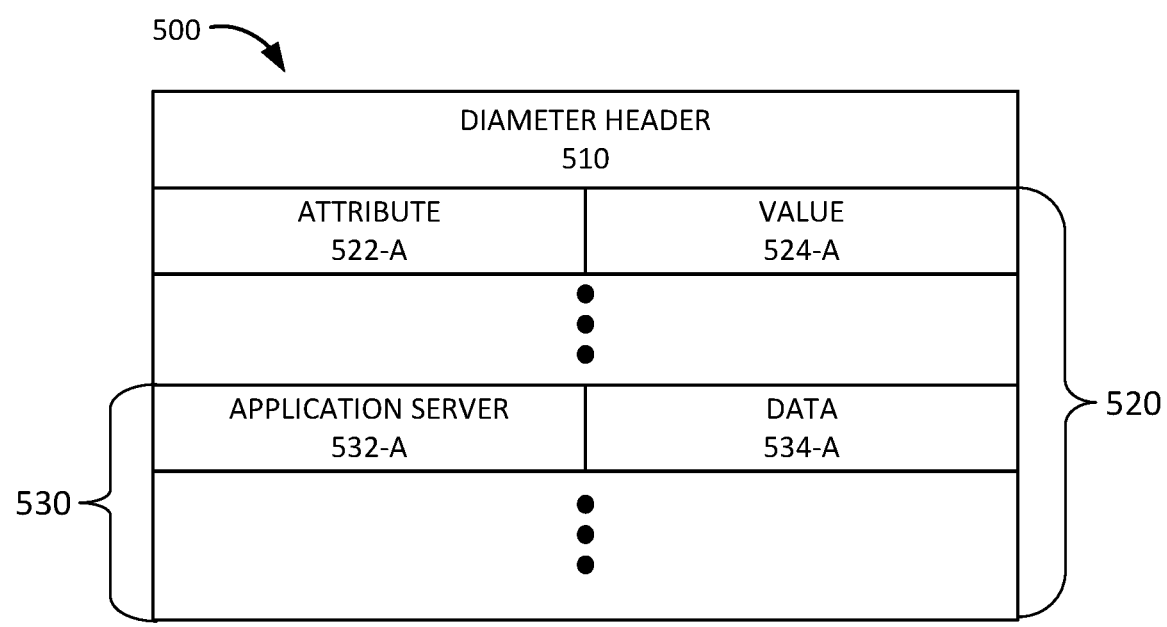
FIG. 5 is a diagram illustrating an exemplary Diameter protocol message according to an implementation described herein.

FIG. 5 is a diagram illustrating an exemplary Diameter message 500 according to an implementation described herein. As shown in FIG. 5, Diameter message 500 may include a Diameter header 510 and a set of AVPs 520. Diameter header 510 may include various identifiers, such as a hop-by-hop identifier, end-to-end identifier, a command code identifier, and/or an application identifier. Furthermore, Diameter header 510 may include an EPS bearer identifier that may be used to identify UE device 110.

Each AVP 520 may include an attribute field 552 and a corresponding value field 524 (exemplary attribute field 522-A and value field 524-A are shown in FIG. 5). As further shown in FIG. 5, AVPs 520 may include one or more AS AVPs 530. Each AS AVP 530 may include an AS field 532 and a corresponding data field 534 (exemplary AS field 532-A and value field 534-A are shown in FIG. 5). AS field 532 may include one or more AS identifiers and the corresponding data field 534 may include uplink data (if Diameter message 500 is being sent from MME 220 to SCEF 260) or downlink data (if Diameter message 500 is being sent from SCEF 260 to MME 220) associated with the one or more AS identifiers.

Although FIG. 5 shows exemplary fields of Diameter message 500, in other implementations, Diameter message 500 may include different, differently arranged, fewer, or additional fields than depicted in FIG. 5. As an example, in some implementations, a single AVP may be used to identify which AS's are to receive the uplink data. For example, a "Server Name" AVP may include a server name attribute field that includes one or more AS identifiers and a value field that stores the uplink data. In such implementations, each identified AS may receive the same uplink data.

Figure 6:
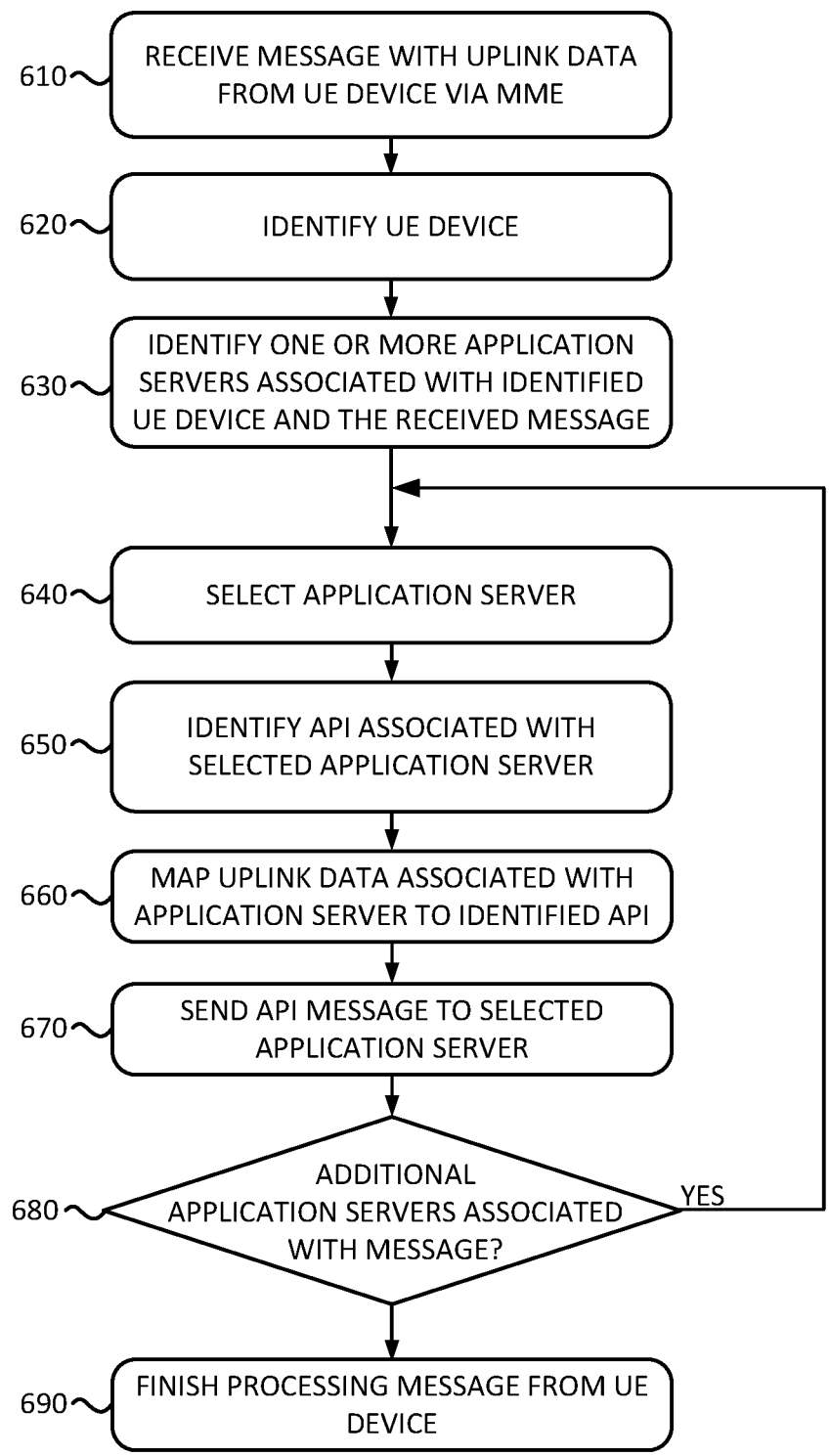
FIG. 6 is a flowchart of a process for sending a message to multiple application servers according to an implementation described herein.

FIG. 6 is a flowchart of a process for sending a message to multiple application servers according to an implementation described herein. In some implementations, the process of FIG. 6 may be performed by SCEF 260. In other implementations, some or all of the process of FIG. 6 may be performed by another device or a group of devices separate from SCEF 260, such as another component of access network 130.

The process of FIG. 6 may include receiving a message with uplink data from UE device 110 via MME 220 (block 610). For example, SCEF 260 may receive a Diameter protocol message 500 from MME 220 via T6a interface 274. UE device 110 may be identified (block 620). For example, SCEF 260 may retrieve an EPS bearer identifier from Diameter protocol message 500 and may identify a UE record 442 in UE DB 440 based on the EPS bearer identifier.

One or more AS's 150 associated with the received message may be identified (block 630). For example, SCEF 260 may retrieve one or more AS identifiers from AS fields 532 and may identify AS's 150 associated with the retrieved AS identifiers based on information stored in AS DB 450.

An AS 150 may be selected (block 640), an API associated with the selected AS 150 may be identified (block 650), uplink data associated the selected AS 150 may be mapped to the identified API (block 660), and the API message may be sent to the selected AS 150 (block 670).

For example, SCEF 260 may select one of the AS identifiers included in the received message, may retrieve uplink data associated with the selected AS identifier from the received message, may select an API associated with the selected AS identifier, and may use information included in API field 456 of AS record 452 associated with the selected AS identifier to map the retrieved uplink data to the selected API. The API message with the mapped uplink data may then be sent to a destination associated with the selected AS 150.

A determination may be made as to whether there are additional AS's 150 associated with the received message (block 680). For example, SCEF 260 may determine whether additional AS identifier short codes are included in the Diameter protocol message received from MME 220. If additional AS's 150 are associated with the received message (block 680—YES), processing may return to block 640 to select another AS 150 associated with the received message. If no additional AS's 150 are associated with the received message (block 680—NO), processing of the message received from UE device 110 may be finished (block 690).

In some implementations, AS's 150 may be organized into categories and a particular AS identifier may be associated with a category of AS's 150. Thus, if a received message includes an AS identifier associated with an AS category, SCEF 260 may determine that the uplink data associated with the AS identifier should be sent to all AS's 150 included in the AS category and associated with UE device 110.

Figure 7:
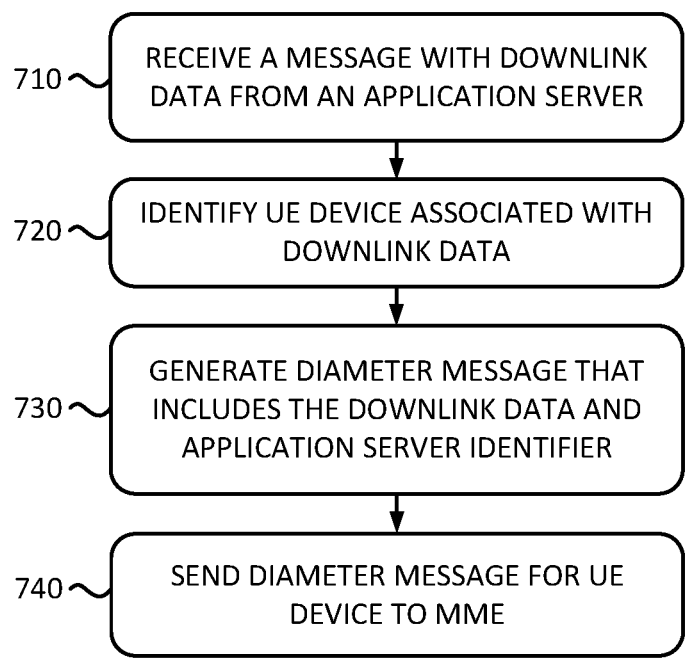
FIG. 7 is a flowchart of a process for sending a message from an application server according to an implementation described herein.

FIG. 7 is a flowchart of a process for sending a message from an application server according to an implementation described herein. In some implementations, the process of FIG. 7 may be performed by SCEF 260. In other implementations, some or all of the process of FIG. 7 may be performed by another device or a group of devices separate from SCEF 260, such as another component of access network 130.

The process of FIG. 7 may include receiving a message with downlink data from AS 150 (block 710). For example, SCEF 260 may receive a message via an API 276 associated with a particular AS 150. SCEF 260 may identify the particular AS 150 based on an AS identifier included in the received message. UE device 110 associated with the downlink data may be identified (block 720). For example, SCEF 260 may identify UE device 110 based on a UE device identifier included in the received API message.

A Diameter message that includes the downlink data and an AS identifier may be generated (block 730) and sent to UE device 110 via MME 220 (block 740). For example, SCEF 260 may generate a Diameter message that includes an EPS bearer ID for the identified UE device 110, retrieved from UE record 442 associated with the identified UE device 110. Furthermore, SCEF 260 may retrieve downlink data from the received API message using information stored in API field 456 of AS record 452 associated with the particular AS 150. SCEF 260 may generate an AS AVP 530 that includes an AS identifier associated with the particular AS 150 and the retrieved downlink data. SCEF 260 may send the Diameter message to MME 220 via T6a interface 274.

In some implementations, SCEF 260 may be configured to send messages with downlink data to multiple UE devices 110 based on a single message received from a particular AS 150. For example, SCEF 260 may identify multiple UE devices 110 associated with the particular AS 150, based on information stored in AS record 452 associated with the particular AS 150, and may generate a Diameter message for each of the multiple UE devices 110, with each Diameter message including an EPS bearer identifier for a particular one of the multiple UE devices 110 and the downlink data.

Figure 8:
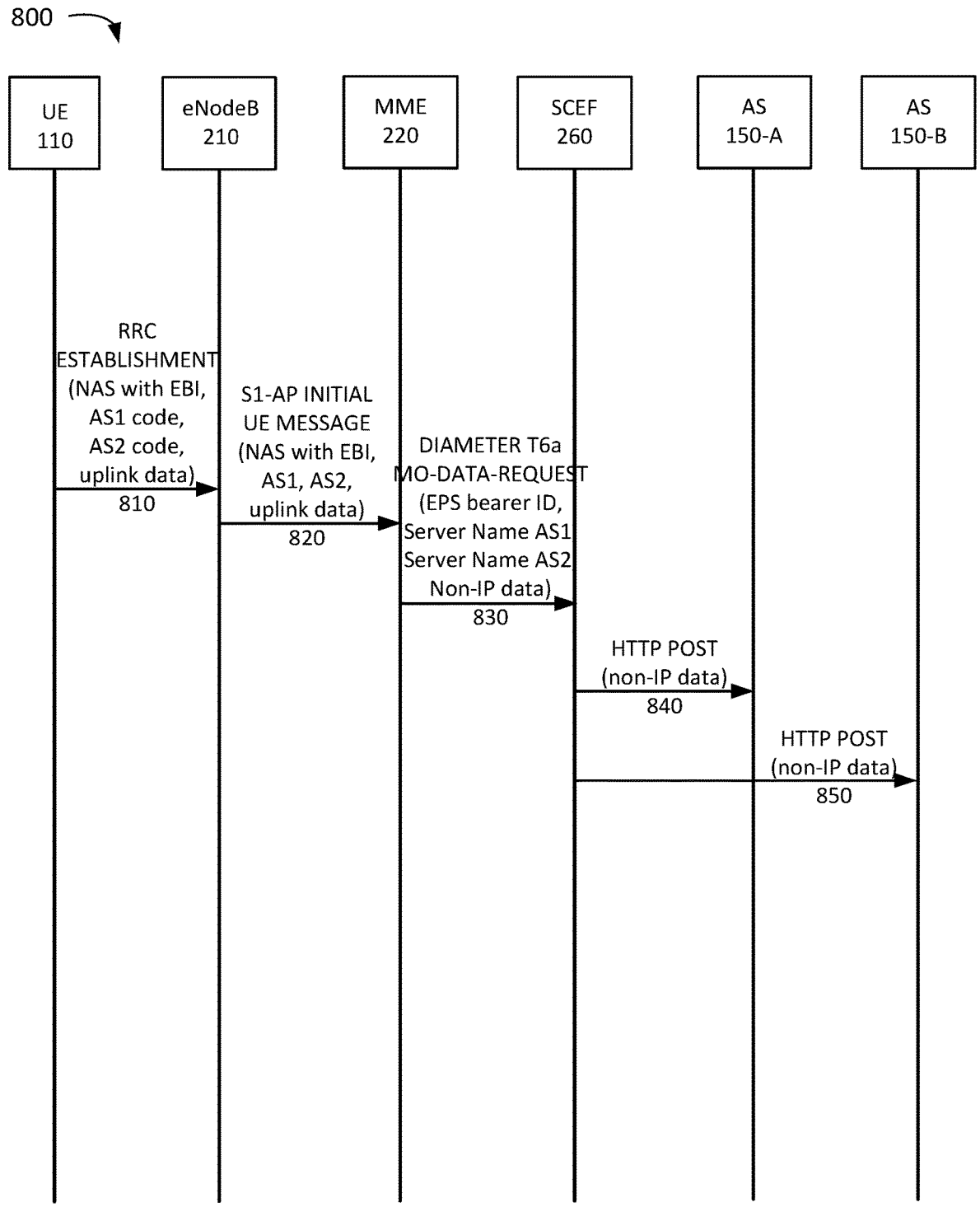
FIG. 8 is a diagram of a first exemplary signal flow according to an implementation described herein.

FIG. 8 is a diagram of a first exemplary signal flow 800 according to an implementation described herein. In signal flow 800, one UE device 110 message is used to send non-IP data to multiple AS's 150. As shown in FIG. 8, signal flow 800 may include UE device 110 sending a Radio Resource Control (RCC) establishment message to eNodeB 210 (signal 810) and eNodeB 210 sending an S1-AP initial UE message to MME 220 (signal 820). The RCC establishment message and the S1-AP initial UE message may include a NAS message that includes an EPS bearer identifier, an AS1 code, an AS2 code, and uplink data.

MME 220 may receive the NAS message, generate a Diameter protocol message (e.g., an MO-Data-Request message), and send the Diameter protocol message using T6a interface 274 to SCEF 260 (signal 830). The Diameter message may include the EPS bearer ID, AS1 and AS2 codes included in a Server Name AVP, and the uplink data as non-IP data. SCEF 260 may receive the Diameter message and may generate a first Hypertext Transfer (HTTP) POST message to first AS 150-A using an API associated with first AS 150-A, with uplink data from the received Diameter protocol message (signal 840). Furthermore, SCEF 260 may generate a second HTTP POST message to second AS 150-B using an API associated with second AS 150-B, with uplink data from the received Diameter protocol message (signal 850).

Figure 9:
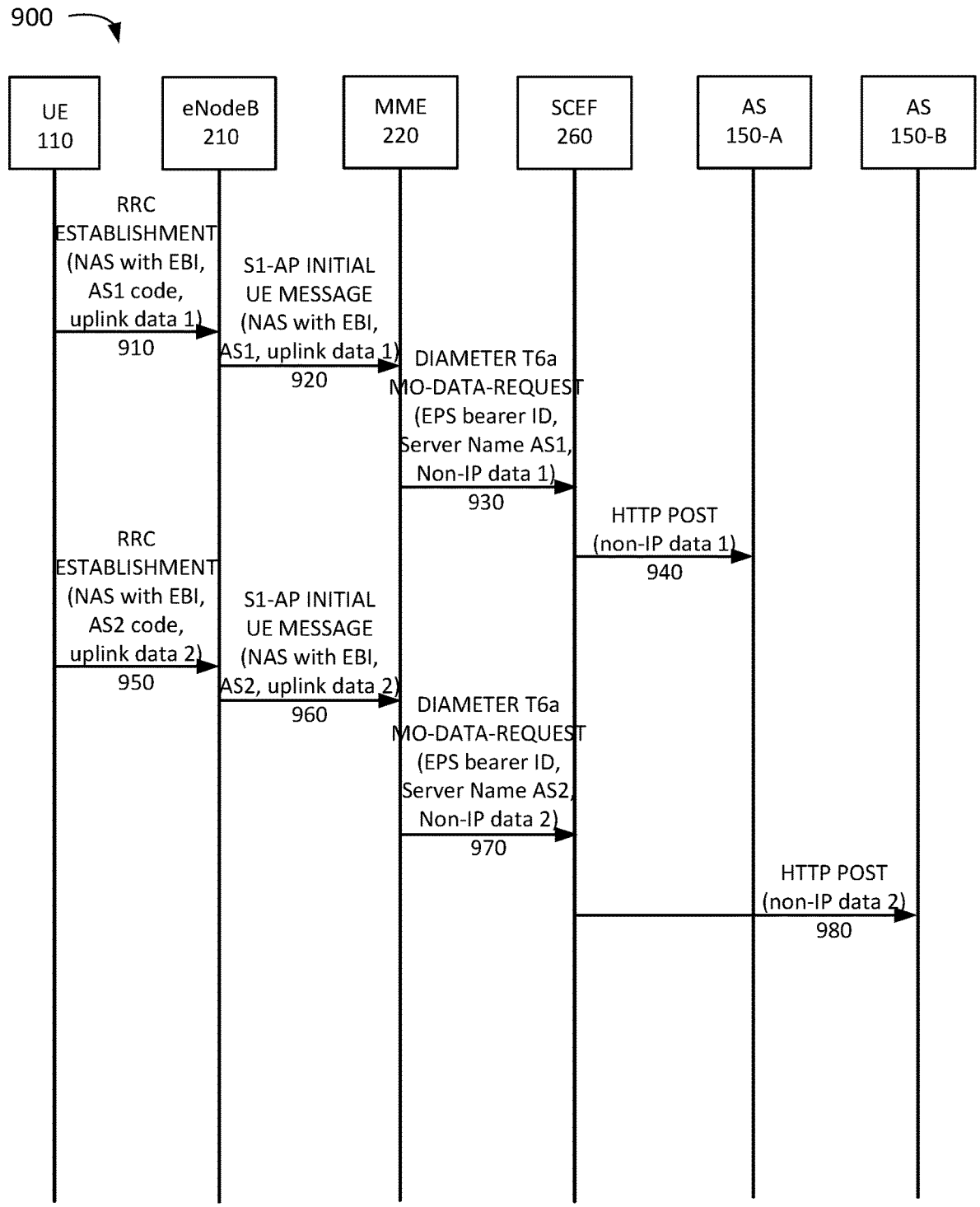
FIG. 9 is a diagram of a second exemplary signal flow according to an implementation described herein.

FIG. 9 is a diagram of a second exemplary signal flow 900 according to an implementation described herein. In signal flow 900, different UE device 110 messages are used to send non-IP data to different AS's 150. As shown in FIG. 9, signal flow 900 may include UE device 110 sending a first RCC establishment message to eNodeB 210 (signal 910) and eNodeB 210 sending an S1-AP initial UE message to MME 220 (signal 920). The first RCC establishment message and the S1-AP initial UE message may include a first NAS message that includes an EPS bearer identifier, an AS1 code, and a first uplink data.

MME 220 may receive the first NAS message, generate a first Diameter protocol message (e.g., an MO-Data-Request message), and send the first Diameter protocol message using T6a interface 274 to SCEF 260 (signal 930). The first Diameter message may include the EPS bearer ID, an AS1 code included in a Server Name AVP, and the first uplink data as non-IP data. SCEF 260 may receive the first Diameter message and may generate a first HTTP POST message to first AS 150-A using a first API associated with first AS 150-A, with first uplink data from the received first Diameter protocol message (signal 940).

Furthermore, UE device 110 may send a second RCC establishment message to eNodeB 210 (signal 950) and eNodeB 210 may send an S1-AP initial UE message to MME 220 (signal 960). The second RCC establishment message and the S1-AP initial UE message may include a second NAS message that includes an EPS bearer identifier, an AS2 code, and a second uplink data.

MME 220 may receive the second NAS message, generate a second Diameter protocol message, and send the second Diameter protocol message using T6a interface 274 to SCEF 260 (signal 970). The second Diameter message may include the EPS bearer ID, an AS2 code included in a Server Name AVP, and the second uplink data as non-IP data. SCEF 260 may receive the second Diameter message and may generate a second HTTP POST message to second AS 150-B using a second API associated with second AS 150-B, with second uplink data from the received second Diameter protocol message (signal 980).

Figure 10:
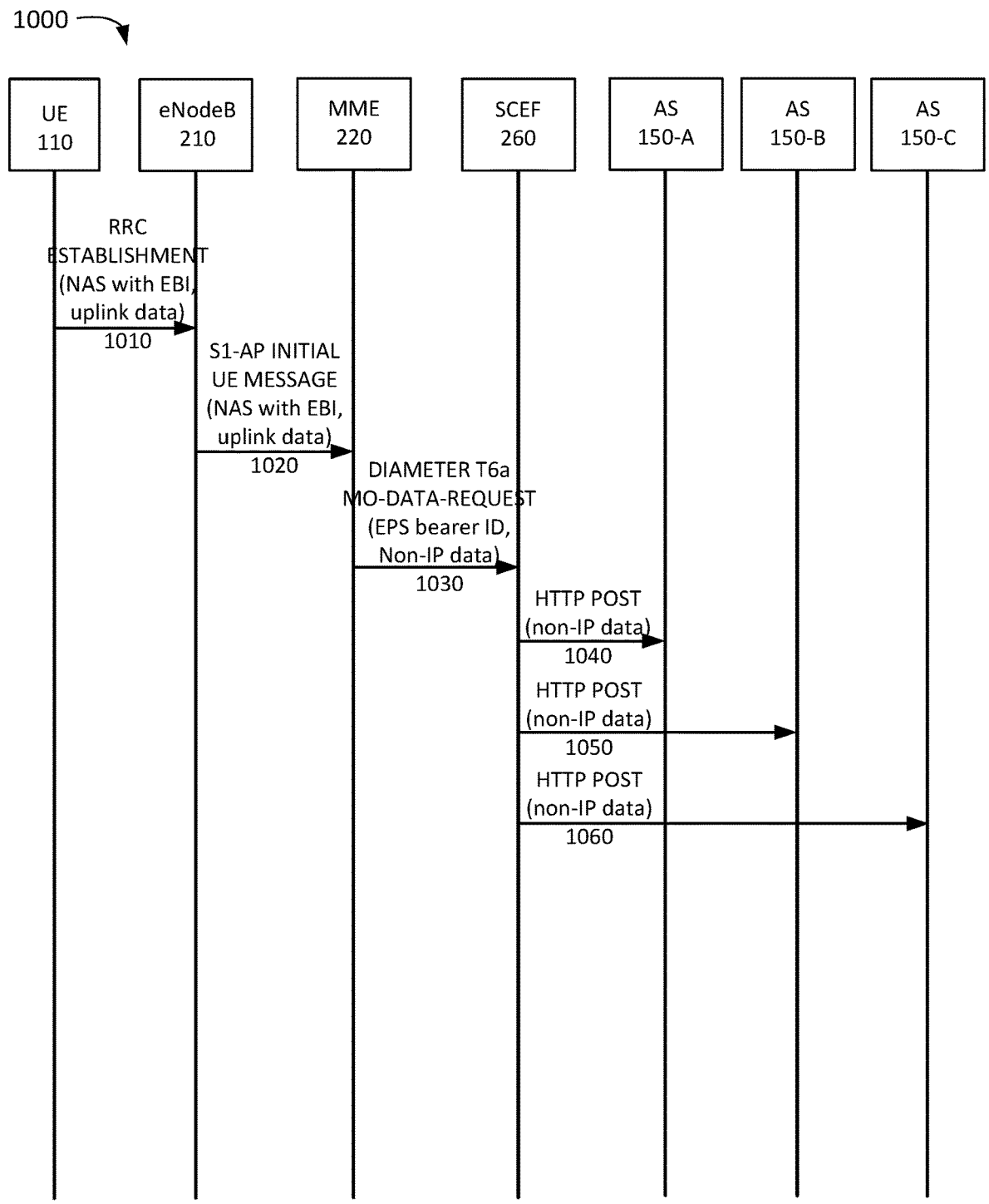
FIG. 10 is a diagram of a third exemplary signal flow according to an implementation described herein.

FIG. 10 is a diagram of a third exemplary signal flow 1000 according to an implementation described herein. In signal flow 1000, a UE device 110 message may not include any AS identifiers and thus messages may be sent to all AS's 150 associated with UE device 110. UE device 110 may send an RCC establishment message to eNodeB 210 (signal 1010) and eNodeB 210 may send an S1-AP initial UE message to MME 220 (signal 1020). The RCC establishment message and the S1-AP initial UE message may include a NAS message that includes an EPS bearer identifier and uplink data.

MME 220 may receive the NAS message, generate a Diameter protocol message (e.g., an MO-Data-Request message), and send the Diameter protocol message using T6a interface 274 to SCEF 260 (signal 1030). The Diameter message may include the EPS bearer ID and the uplink data as non-IP data. SCEF 260 may receive the Diameter message and may determine that no AS identifiers are included in the Diameter message. In response, SCEF 260 may select to send messages to all AS's 150 associated with UE device 110. SCEF 260 may access UE record 442 associated with the EPS bearer ID and may determine that UE device 110 is associated with three AS's 150: AS 150-A, AS 150-B, and AS 150-C.

In response, SCEF 260 may generate a first HTTP POST message to first AS 150-A using an API associated with first AS 150-A, with uplink data from the received Diameter protocol message (signal 1040). SCEF 260 may then generate a second HTTP POST message to second AS 150-B using an API associated with second AS 150-B, with uplink data from the received Diameter protocol message (signal 1050). Furthermore, SCEF 260 may generate a third HTTP POST message to third AS 150-C using an API associated with third AS 150-C, with uplink data from the received Diameter protocol message (signal 1060).

Figure 11:
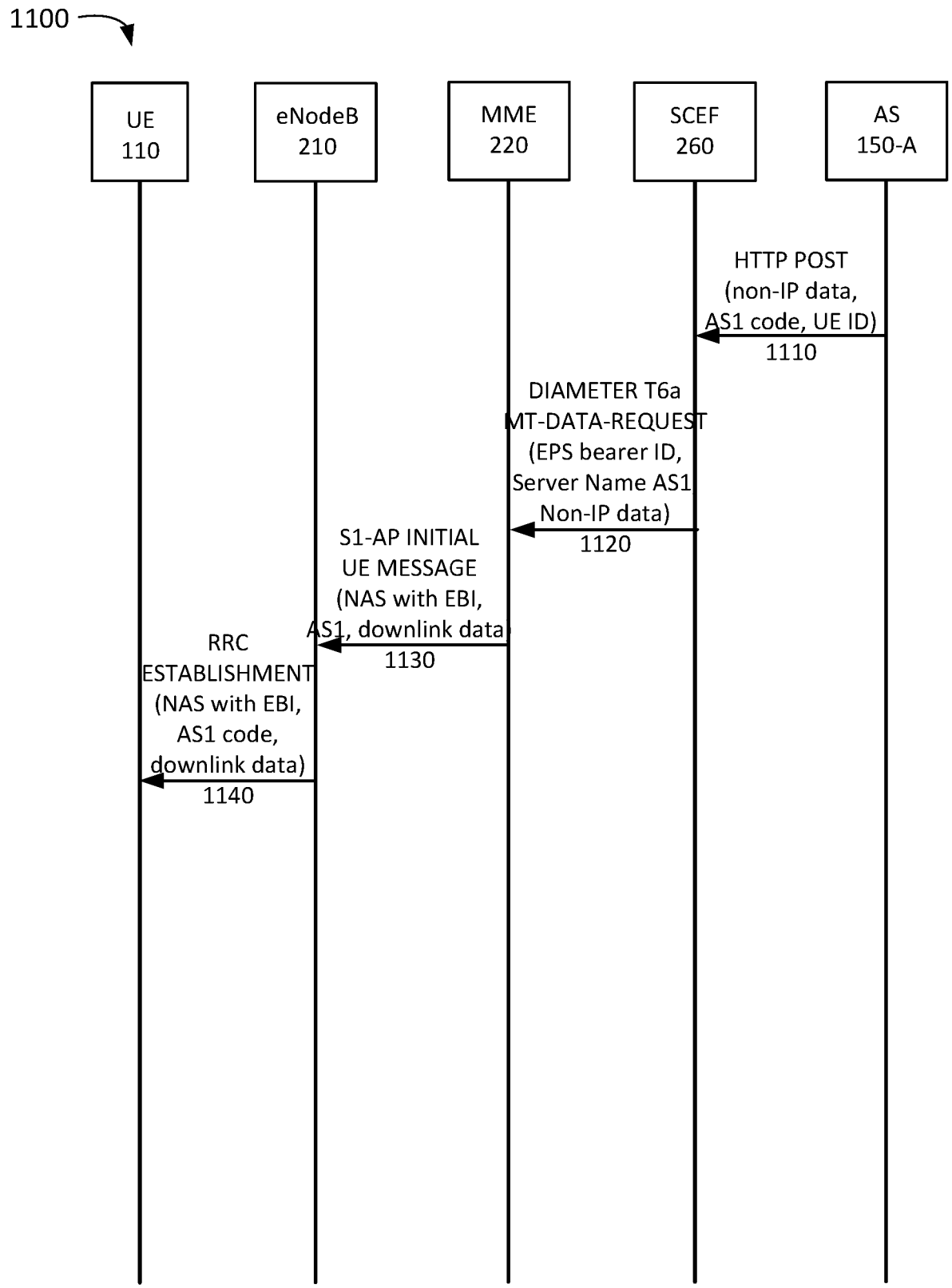
FIG. 11 is a diagram of a fourth exemplary signal flow according to an implementation described herein.

FIG. 11 is a diagram of a fourth exemplary signal flow 1100 according to an implementation described herein. In signal flow 1100, AS 150-A sends downlink non-IP data to UE device 110. As shown in FIG. 11, signal flow 1100 may include AS 150-A sending an HTTP POST message to SCEF 260 (signal 1110). The HTTP POST message may include an AS1 identifier, a UE device identifier, and downlink data. SCEF 260 may receive the message from AS 150-A and may generate a Diameter protocol T6a MT-Data-Request message and send the Diameter protocol T6a MT-Data-Request message to MME 220 (signal 1120). The Diameter message may include the EPS bearer identifier, the AS1 code in application server field 532 included in an AVP pair of the MT-Data-Request message, and the downlink data in data field 534.

MME 220 may generate an S1-AP initial UE message that includes a NAS message that includes an EPS bearer identifier, the AS1 code, and the downlink data and send the S1-AP initial UE message to eNodeB 210 (signal 1130). eNodeB 210 may send an RCC establishment message, which includes a NAS message with the EPS bearer identifier, the AS1 code, and the downlink data, to UE device 110 (signal 1140).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signal flows has been described with respect to FIGS. 8, 9, 10, and 11, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  receiving, by a computing device, a message from a user equipment (UE) device via a Mobility Management Entity (MME), wherein the computing device is configured as a Service Capability Exposure Function (SCEF) device, wherein the SCEF device is configured to support multiple application server connections for the UE device via a single Access Point Name (APN) associated with the computing device, and wherein the message corresponds to a Diameter T6a protocol interface message that includes an MO-Data-Request message that includes an attribute-value pair that identifies one or more application server identifiers;
  identifying, by the computing device, an application server associated with the message based on one or more application server identifiers included in the received message;
  mapping, by the computing device, uplink data, included in the received message and associated with the identified application server, to an application programming interface (API) associated with the identified application server; and
  sending, by the computing device, the mapped uplink data to the identified application server using the API associated with the identified application server.

2. The method of claim 1, wherein the application server includes a plurality of application servers, wherein mapping the uplink data includes mapping uplink data associated with particular ones of the plurality of application servers to APIs associated with the particular ones of the plurality of application servers, and wherein sending the mapped uplink data includes sending the mapped uplink data to the particular ones of the plurality of application servers.

3. The method of claim 1, wherein identifying the application server associated with the message based on one or more application server identifiers included in the received message includes:
  mapping an identifier associated with the UE device to the one or more application server identifiers.

4. The method of claim 1, further comprising:
  receiving another message from the MME associated with the UE device;
  determining that the received other message does not include an application server identifier; and
  sending a message to all application servers associated with the UE device, in response to determining that the received other message does not include an application server identifier.

5. The method of claim 1, further comprising:
  receiving an application server message from the application server;
  identifying the UE device as being associated with the application server message; and
  sending a Diameter message for the UE device via the MME, wherein the Diameter message includes downlink data included in the received application server message.

6. The method of claim 5, further comprising:
  determining an application server identifier associated with the application server message; and
  including the determined application server identifier in the Diameter message sent for the UE device via the MME, wherein the determined application server identifier is included in an attribute-value pair of an MT-Data-Request message included in the Diameter message.

7. A computer device comprising:
  a memory configured to store instructions; and
  a processor configured to execute the instructions to:

receive a message from a user equipment (UE) device via a Mobility Management Entity (MME), wherein the computer device is configured as a Service Capability Exposure Function (SCEF) device, and wherein the SCEF device is configured to support multiple application server connections for the UE device via a single Access Point Name (APN) associated with the computing device;

identify an application server associated with the message based on one or more application server identifiers included in the received message;

map uplink data, included in the received message and associated with the identified application server, to an application programming interface (API) associated with the identified application server;

send the mapped uplink data to the identified application server using the API associated with the identified application server;

receive another message from the MME associated with the UE device;

determine that the received other message does not include an application server identifier; and send a message to all application servers associated with the UE device, in response to determining that the received other message does not include an application server identifier.

8. The computer device of claim 7, wherein the application server includes a plurality of application servers, wherein, when mapping the uplink data, the processor is further configured to map uplink data associated with particular ones of the plurality of application servers to APIs associated with the particular ones of the plurality of application servers, and wherein, when sending the mapped uplink data, the processor is further configured to send the mapped uplink data to the particular ones of the plurality of application servers.

9. The computer device of claim 7, wherein, when identifying the application server associated with the message based on one or more application server identifiers included in the received message, the processor is further configured to:

map an identifier associated with UE device to the one or more application server identifiers.

10. The computer device of claim 7, wherein the message corresponds to a Diameter protocol T6a interface message.

11. The computer device of claim 10, wherein the Diameter T6a protocol interface message includes an MO-Data-Request message that includes an attribute-value pair that identifies one or more application server identifiers.

12. The computer device of claim 7, wherein the processor is further configured to:

receive an application server message from the application server;

identify the UE device as being associated with the application server message; and send a Diameter message for the UE device via the MME, wherein the Diameter message includes downlink data included in the received application server message.

13. The computer device of claim 12, wherein the processor is further configured to:

determine an application server identifier associated with the application server message; and include the determined application server identifier in the Diameter message sent for the UE device via the MME.

14. A system comprising:

a Mobility Management Entity (MME) device configured to:

receive a message from a user equipment (UE) device; and send a Diameter protocol T6a interface message based on the received message, wherein the Diameter protocol T6a message includes an MO-Data-Request message that includes an attribute-value pair that identifies the one or more application server identifiers; and a Service Capability Exposure Function (SCEF) device configured to:

support multiple application server connections for the UE device via a single Access Point Name (ANP) associated with the computing device;

receive the Diameter protocol T6a interface message from the MME device;

identify an application server associated with the Diameter protocol T6a interface message based on the one or more application server identifiers included in the received Diameter protocol T6a interface message;

map uplink data, included in the received Diameter protocol T6a interface message and associated with the identified application server, to an application programming interface (API) associated with the identified application server; and send the mapped uplink data to the identified application server using the API associated with the identified application server.

15. The system of claim 14, wherein the SCEF device is further configured to:

receive an application server message from the application server;

identify the UE device as being associated with the application server message; and send a Diameter message for the UE device via the MME device, wherein the Diameter message includes downlink data included in the received application server message.

16. The system of claim 14, wherein the SCEF device is further configured to:

receive an application server message from the application server;

identify the UE device as being associated with the application server message;

determine an application server identifier associated with the application server message; and send a Diameter message for the UE device via the MME device, wherein the Diameter message includes downlink data included in the received application server message, and wherein the Diameter message includes the determined application server identifier in an attribute-value pair of an MT-Data-Request message included in the Diameter message.

17. The system of claim 14, wherein the application server includes a plurality of application servers, wherein, when mapping the uplink data, the SCEF device is further configured to map uplink data associated with particular ones of the plurality of application servers to APIs associated with the particular ones of the plurality of application servers, and wherein, when sending the mapped uplink data, the SCEF device is further configured to send the mapped uplink data to the particular ones of the plurality of application servers.

18. The system of claim 14, wherein the SCEF device is further configured to:

receive another message from the MME device;

determine that the received other message does not include an application server identifier; and send a message to all application servers associated with the UE device, in response to determining that the received other message does not include an application server identifier.

19. The system of claim 14, wherein when identifying an application server associated with the Diameter protocol T6a interface message based on the one or more application server identifiers included in the received Diameter protocol T6a interface message, the SCEF device is further configured to:

map an identifier associated with UE device to the one or more application server identifiers.

20. The system of claim 14, wherein the MME device is configured to receive the message from the UE device as a Non-Access Stratum (NAS) message.

* * * * *